(12) United States Patent
Yagi et al.

(10) Patent No.: US 6,215,114 B1
(45) Date of Patent: Apr. 10, 2001

(54) OPTICAL PROBE FOR DETECTING OR IRRADIATING LIGHT AND NEAR-FIELD OPTICAL MICROSCOPE HAVING SUCH PROBE AND MANUFACTURING METHOD OF SUCH PROBE

(76) Inventors: Takayuki Yagi; Tsutomu Ikeda; Ryo Kuroda; Yasuhiro Shimada, all of c/o Canon Kabushiki Kaisha, 30-2, Shimomaruko 3-chome, Ohta-ku, Toyko (JP)

(*) Notice: Subject to any disclaimer, the term of this patent is extended or adjusted under 35 U.S.C. 154(b) by 0 days.

(21) Appl. No.: 09/158,494

(22) Filed: Sep. 23, 1998

(30) Foreign Application Priority Data

Sep. 25, 1997 (JP) .................................................. 9-278284
Sep. 9, 1998 (JP) .................................................. 10-272600

(51) Int. Cl.[7] ................................. H01L 21/00; H01J 5/16
(52) U.S. Cl. ........................................... 250/216; 438/735
(58) Field of Search .................................... 250/234, 216, 250/306, 307; 438/7, 8, 62, 71, 689, 733, 735, 737, 738; 257/774

(56) References Cited

U.S. PATENT DOCUMENTS 5,294,790 * 3/1994 Ohta et al. ............................ 250/216
5,354,695 * 10/1994 Leedy ....................................... 438/7
5,354,985   10/1994 Quate .................................... 250/234
6,046,972 * 4/2000 Kuroda et al. ......................... 250/306

FOREIGN PATENT DOCUMENTS 0 122 402   7/1984 (EP).

OTHER PUBLICATIONS

Binning, G., et al., "Surface Studies by Scanning Tunnelling Microscopy", Physical Review Letters, vol. 49, No. 1, pp. 57–61 (Jul. 1982).
Dürig, U., et al., "Near–Field Optical–Scanning Microscopy", Journal of Applied Physics, vol. 59, No. 10. pp. 3318–3327 (May 1986).
Reddick, R.C., et al., "New Form of Scanning Optical Microscopy", Physical Review B (Condensed Matter), vol. 39, No. 1, pp. 767–770 (Jan. 1989).

* cited by examiner

Primary Examiner—John R. Lee
Assistant Examiner—Kevin Pyo (57) ABSTRACT

An optical prove for detecting or irradiating evanescent light is manufactured by forming a film having a regulated film thickness on a substrate, then forming a recess from the rear surface of the substrate, and forming a through hole in the film from the side of the recess by etching. The obtained optical probe has a micro-aperture at the tip of the through hole and usually, a plurality of optical probes each having a micro-aperture of uniform profile are formed on a single substrate. In the recess, light-receiving or light-irradiating means may be provided.

19 Claims, 7 Drawing Sheets

OPTICAL PROBE FOR DETECTING OR IRRADIATING LIGHT AND NEAR-FIELD OPTICAL MICROSCOPE HAVING SUCH PROBE AND MANUFACTURING METHOD OF SUCH PROBE

BACKGROUND OF THE INVENTION

1. Field of the Invention

This invention relates to an optical probe for detecting or irradiating evanescent light to be used for a near-field optical microscope. It also relates to a method of manufacturing such an optical probe.

2. Related Background Art

The recent development of the scanning tunneling microscope adapted for direct observation of the electron structure of surface atoms of a conductor has made it possible to visually observe an image of the real space of a specimen with an enhanced degree of resolution regardless of whether the specimen is monocrystalline or noncrystalline (G. Binnig et al., Phys. Rev. Lett. 49, 57 (1983)). Since then, research efforts have been paid on the scanning probe microscope (hereinafter referred to as SPM) particularly in an attempt to look into the micro-structures of various materials.

SPMs include scanning tunneling microscopes (STMs), atomic force microscopes (AFMs) and magnetic force microscope (MFMS) that are adapted to observe the surface structure of a specimen by detecting tunnel current, atomic force, magnetic force or light occurring when a probe having a micro-tip is brought very close to the specimen.

The scanning near-field optical microscope (hereinafter referred to as SNOM) has been developed from the STM. It can be used to examine the surface of a specimen by detecting evanescent light seeping out from the surface of the specimen being observed through the micro-aperture arranged at the micro-tip of the sharp probe of the microscope (Durig et al., J. Appl. Phys. 59, 3318 (1986)).

The photon STM (hereinafter referred to as PSTM) is a type of SNOM and adapted to examine the surface of a specimen by striking the specimen from the backside with a beam of light, making the beam totally reflected by the specimen, and then detecting evanescent light seeping out from the surface of the specimen by means of an optical probe (Reddick et al., Phys. Rev. B39, 767 (1989)).

Both the SNOM and the PSTM are designed to nondestructively observe the surface profile of the specimen including a micro pattern, if any, with an enhanced degree of positional resolution exceeding $\lambda/2$ that cannot be achieved by any conventional optical microscope, by utilizing evanescent light emitted through a very fine pin hole. Thus, they can be used to observe a wide variety of specimens including living bodies and cells of which observation was difficult and hence provide a broad scope of applicability. Since the resolution of the SNOM is defined by the diameter of the micro-tip of the optical probe, efforts have been paid to improve the optical probe. According to a proposed technique for the PSTM, for example, the micro-tip of the optical probe is sharpened by optimizing the conditions under which a chemical etching operation is conducted to etch an end surface of the optical fiber to be used as optical probe without arranging a micro-aperture at the tip of the optical probe in an attempt to improve the resolution. In the initial stages of development of the SNOM, a micro-aperture is formed by coating the crossing of cleaved planes of a transparent crystal with metal and then removing the metal from the crossing by pressing the metal-coated crossing against a very hard surface (European Patent EP0112402). More recently, a technique of preparing a micro-aperture by photolithography has been proposed. There is also a proposed technique of preparing an optical probe by forming a micro-aperture and an optical waveguide in an integrated fashion (U.S. Pat. No. 5,354,985).

However, if no micro-aperture is formed in the optical probe as described above by referring to the PSTM, the probe will detect not only evanescent light but also stray light scattered by the undulations of the surface of the specimen to consequently degrade the resolution of the microscope.

It is difficult to produce a plurality of fine optical probes in an integrated fashion by the known technique of etching an optical fiber. It is also difficult to arrange a plurality of optical probes in an array in order to improve the detection speed of the PSTM. Additionally, when an optical fiber is used for the SNOM or the PSTM, it has to be aligned with the optical axis of the light emitting device or the light receiving device which also makes it difficult to arrange optical probes in an array. If a plurality of optical fibers are used, then a plurality of drive means have to be used to drive the optical fibers to come closer to the surface of the specimen. Then, it is very difficult to densely arrange a large number of optical probes.

On the other hand, with the technique of forming a micro-aperture by means of photolithography, the surface of a substrate is processed by photolithograpy and etching. Then, the size of the minimal possible aperture that can be produced with such a technique will be 100 nm at most and it is practically impossible to produce a micro-aperture as small as 10 nm. Therefore, the resolution of the SNOM is inevitably limited by the above technical limitation. Additionally, this technique is time consuming and costly because it is complicated and involves complex processing steps. While it is theoretically possible to form a micro-aperture smaller than 100 nm by means of an electron beam processing apparatus or a focused ion beam processing apparatus, the use of such an apparatus entails an aligning process that has to be controlled in a complicated manner and a problem of dimensional irregularity of the produced optical probes. Additionally, optical probes have to be prepared on a one by one basis to reduce the yield and the throughput.

SUMMARY OF THE INVENTION

In view of the above identified technical problems of the prior art, it is therefore an object of the present invention to provide an optical probe for detecting or irradiating light and a near-field optical microscope comprising such a probe having an evenly profiled micro-aperture that can be driven closer to the specimen with ease to improve the resolution of the microscope and that is adapted to be easily connected to light detecting means or light emitting means. It is also an object of the present invention to provide a method of manufacturing a plurality of such optical probes that are arranged highly densely.

According to an aspect of the invention, the above objects are achieved by providing a method of manufacturing an optical probe for detecting or irradiating evanescent light comprising steps of:

forming a film having a regulated film thickness on a substrate;

forming a recess from the rear surface of the substrate; and forming a through hole in the film from the side of the recess by etching.

According to another aspect of the invention, the above objects are achieved by providing an optical probe manufactured by the above method and a near-field optical microscope utilizing such an optical probe.

DESCRIPTION OF THE PREFERRED EMBODIMENTS

Now, a first embodiment of optical probes according to the invention will be described.

Figure 1:
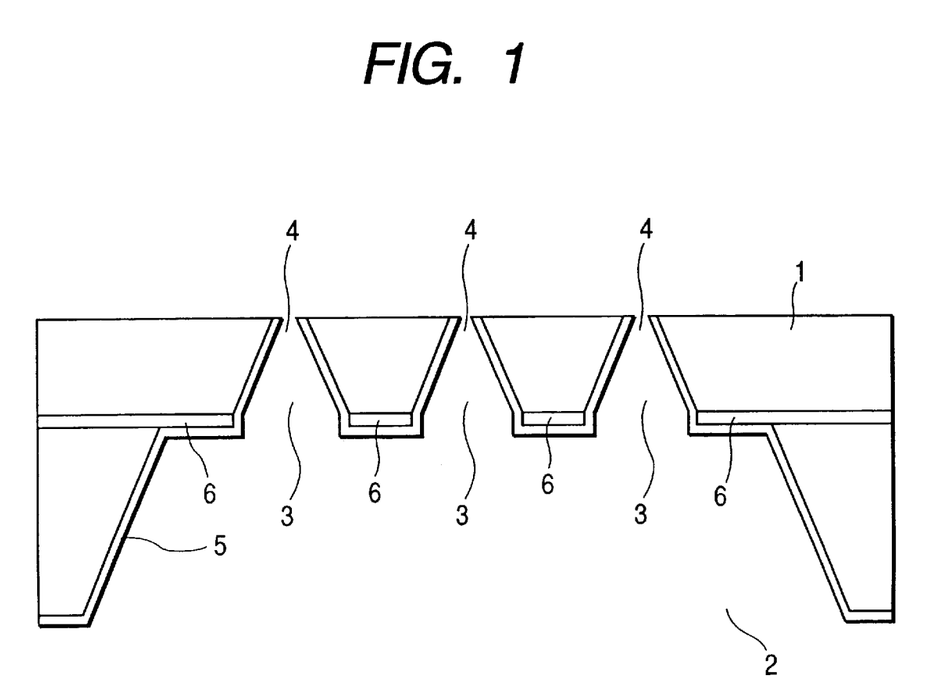
FIG. 1 is a schematic cross sectional view of optical probes according to the invention.

FIG. 1 is a schematic cross sectional view of the first embodiment of optical probes according to the invention. Referring to FIG. 1, a recess 2 is formed from the rear surface of substrate 1 and through holes 3 are opened through the substrate from the recess on the rear side to produce micro-apertures 4 at the front surface of the substrate. An anti-light-transmission film 5 is formed on the wall surface of each of the through holes.

Since the length of the through holes is determined by the distance between the bottom of the recess and the front surface of the substrate, the pitch of arranging through holes in the recess can be raised to increase the density of arrangement of micro-apertures on the front surface of substrate by reducing the thickness of the substrate at the bottom of the recess. Since a number of micro-apertures can be produced on the flat front surface of the substrate, a plurality of optical probes can be driven to come closer to the surface of a specimen simultaneously.

Since optical probes according to the invention are directly formed in a flat substrate, light detecting means or light irradiating means can be connected to the optical probes not via the edge of the substrate but via the flat surface of the substrate to facilitate the connecting operation if compared with a comparable substrate carrying optical waveguides on the surface thereof.

Thus, CCDs as light detecting means or surface light emitting lasers, or surface light emitting diodes as light irradiating means that can easily be formed in a two-dimensional array on a plane may be coupled to the rear ends of the optical probes.

By arranging a number of light detecting means or light irradiating means formed in a two-dimensional array to establish a one-to-one relationship with through holes in the above described manner, the optical probes provided with such means can be driven independently and simultaneously to detect light entering through any of the micro-apertures or to irradiate light from any of them. Additionally, by arranging the light detecting means or the light irradiating means in the recess, the optical probes provided with them can be dimensionally further reduced in thickness.

Very fine optical probes having a uniform aperture profile can be formed by forming through holes in a monocrystalline silicon substrate having a planar orientation of plane (100).

Now, the process of forming through holes will be described in detail.

A mask resistant to the etching solution to be used is formed on the rear surface of a silicon substrate and a recess is formed from the rear surface of the substrate by etching. An etching solution adapted to anisotropic etching depending on the crystal orientation is used to etch the silicon substrate from the rear surface. The etching solution typically contains KOH, EDP, TMAH or hydrazine and etches the substrate with different etching rates depending on the crystal plane. The mask may be made of a material such as Cr, Cu, Au, Pt and TiC. The use of silicon nitride film or silicon dioxide film may be preferable because of its compatibility with any semiconductor processes.

An etching stop layer 6 may be arranged in the silicon substrate to control the depth of the recess to be formed. A high concentration p-type diffusion layer will suitably be used for the etching stop layer to exploit the property of such a p-type diffusion layer of not being etched by an etching solution adapted to anisotropic etching relative to the crystallographic axis if it contains impurities to a concentration of more than $7 \times 10^{19}$ cm$^{-3}$. The through holes are formed in the epitaxial layer grown on the p-type diffusion layer.

Part of the p-type diffusion layer is patterned and the through holes are formed in the epitaxial layer so that they have openings coresponding to the patterned area on the rear side. The micro-apertures on the front surface of the substrate can be rigorously controlled by controlling the thickness of the epitaxial layer.

The epitaxial layer may be made to have a thickness greater than the ultimate length of the through holes. Micro-apertures can be produced by forming pyramidal-shaped pits in the substrate from the rear surface by crystal orientation-dependent anisotropic etching and thereafter forming openings at the front ends of the pits by etching the substrate from the front surface. Etching techniques that can be used for this purpose include reactive ion etching (RIE) using reactive etching gas, ion milling and wet etching using an etching solution. The time required for forming micro-apertures for the pits from the surface of the substrate by etching can be reduced and the uniformity of etching over the surface of the substrate can be improved by reducing the thickness of the layer above the recess through which through holes are formed. Additionally, the reproducibility of the etching effect can be improved also by reducing the thickness. The uniformity in the depth of etching over the surface of the substrate and the reproducibility of the etching effect can also be improved by forming silicon dioxide over the surface of the substrate by means of oxidizing gas and using a sacrificial etching technique of etching the silicon dioxide by means of hydrofluoric acid solution.

The above described patterned area can be produced by using a mask on that area before implanting impurity ions to produce a p-type diffusion layer on the substrate, in order to keep it free from impurities.

Alternatively, an n-type diffusion layer formed in a p-type silicon substrate may be used for the etching stop layer by utilizing the pn-junction etching technique. Then, a p-type epitaxial layer is formed on the n-type diffusion layer and through holes are cut through the epitaxial layer. The openings of the through holes on the rear side can be produced by forming a mask for them before implanting impurity ions to produce an n-type diffusion layer on the substrate, in order to keep the spots of the openings free from impurities.

An epitaxial layer is used for the layer through which the through holes are formed in the above description. Alternatively, an SOI (silicon on insulator) arrangement may be used. If such is the case, the insulator layer is used for the etching stop layer. The substrate (handle wafer) to be used for supporting the SOI may be made of glass, sapphire or silicon. With this arrangement, after forming a recess from the rear side of the handle wafer, through holes are opened through the silicon layer of the SOI. In short, through holes are opened through the layer formed on the substrate in which a recess is formed in a subsequent processing step. Single-crystalline silicon is particularly adapted to anisotropic etching using an alkali solution containing KOH or TMAH in order to uniformly produce through holes.

However, still alternatively, any layer made of a material other than silicon may be used to form through holes therethrough provided that the film thickness of the layer can be controlled to form micro-apertures for the through holes.

For example, the layer may be made of polyimide which is an organic material. Firstly, a polyimide film is formed on a silicon substrate and a recess is formed from the rear side of the silicon substrate by etching until the polyimide becomes exposed in the recess on the rear side of the substrate. Then, a mask is arranged to produce through holes by etching. The mask is prepared by forming a metal film on the rear side of the silicon substrate where the recess has been formed and subjecting the metal film to a patterning operation using photolithography to partly remove it. The reactive ion etching technique using oxygen may be used to produce through holes in the polyimide film. This RIE technique using oxygen may be used for any organic film.

Then, an anti-light-transmission film is arranged on the wall surfaces of the through holes to improve the S/N ratio of the operation of receiving and irradiating light by using the through holes. Any material that does not transmit light in a wavelength range to be detected or to be irradiated with may be used. The use of a metal having a high reflectivity of light is preferable.

While the bottom of the recess of the substrate is reduced to a thin film, the remaining portion of the substrate shows the original thickness of the silicon substrate so that the optical probes may be handled with ease for arranging them in a near-field optical microscope if they are used in such a microscope.

Now, the present invention will be described by way of examples.

Example 1

This example represents a first mode of carrying out the method of manufacturing optical probes according to the invention. FIGS. 2A through 2H are schematic cross sectional views of optical probes being prepared by the first mode of carrying out the invention, showing different manufacturing steps.

The manufacturing process of this example will be described below.

Figure 2A:
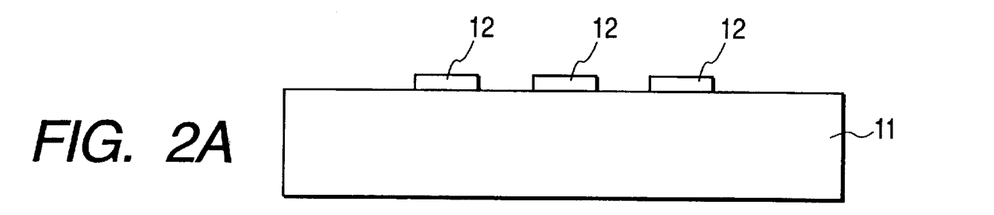
FIGS. 2A, 2B, 2C, 2D, 2E, 2F, 2G and 2H are schematic cross sectional views of optical probes being prepared by a first mode of carrying out the invention, showing different manufacturing steps.

A pattern of photoresist 12 as shown in FIG. 2A was formed on a 525 µm thick silicon substrate 11 having a planar orientation of plane <100>and a resistivity of 1 to 10 Ωcm by using a photolithography process. The pattern had a size of 20 µm square.

Figure 2B:
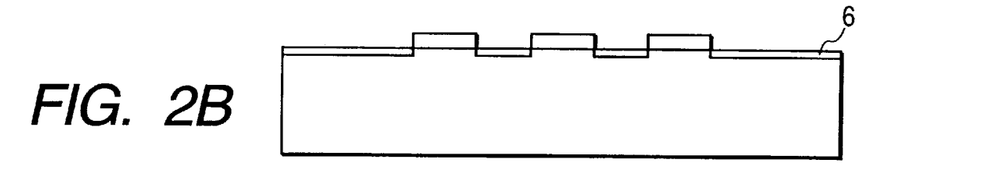

Then, boron (B) ions were implanted into the surface of the silicon substrate by means of an ion implanter, using the photoresist 12 as mask. After removing the photoresist, a p-type diffusion layer having an impurity concentration of $1\times10^{20}$ $cm^{-3}$ was formed for the etching stop layer 6 by thermal diffusion (FIG. 2B).

Figure 2C:
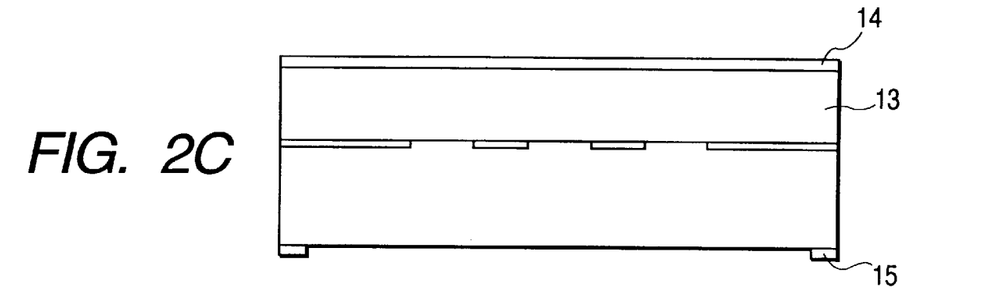

Thereafter, a 15 µm thick epitaxial layer 13, through which through holes were to be opened in a subsequent step, was formed by means of a induction heating type epitaxial growth system, using $SiH_4$ gas. Then, a 1 µm thick silicon dioxide film 14 was thermally grown on the epitaxial layer and the rear surface of the silicon substrate by using a mixture gas of oxygen and hydrogen. Then, the silicon oxide film 14 on the rear surface was partly removed by means of photolithography and etching, using buffered hydrofluoric acid, to produce a mask 15, where the silicon substrate was partly exposed (FIG. 2C).

Figure 2D:
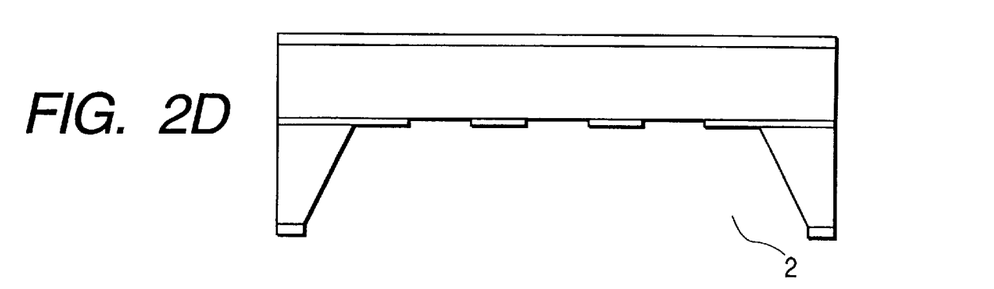

Subsequently, the substrate was subjected to a crystal orientation-dependent anisotropic etching operation using a TMAH aqueous solution with a concentration of 22% at solution temperature of 80° C. to produce a recess 2 having a trapezoidal cross section and surrounded by crystal planes of (111) (FIG. 2D).

Figure 2E:
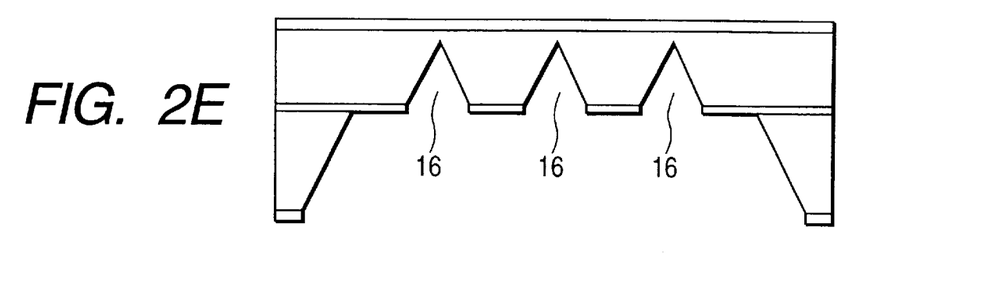

Then, the epitaxial layer was etched further through the spots free from impurities of the etching stop layer by continuing the anisotropic etching to produce pits 16 as shown in FIG. 2E.

Thus, the epitaxial layer was found over the tips of the pits. The pits had a pyramidal-shaped profile surrounded by crystal planes of (111). The etching stop layer was not etched by the anisotropic etching because it was a highly concentrated p-type diffusion layer.

The time required to produce pits was as short as one fortieth of the time used for producing the recess so that the pits could be effectively prevented from any undesired expansion that could have occurred if the etching operation had been prolonged to consequently etch into the plane of (111).

Figure 2F:
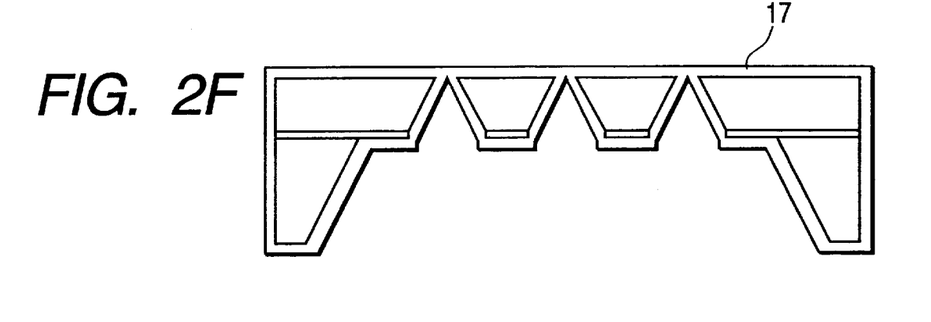

Thereafter, the silicon dioxide on the opposite surfaces of the substrate as shown in FIG. 2E was removed by means of buffered hydrofluoric acid and then the specimen was thermally oxidized using a mixture gas of oxygen and hydrogen until the silicon dioxide 17 formed at the tips of the pits and the silicon dioxide 17 formed at the top of the epitaxial layer came to contact each other (FIG. 2F).

Figure 2G:
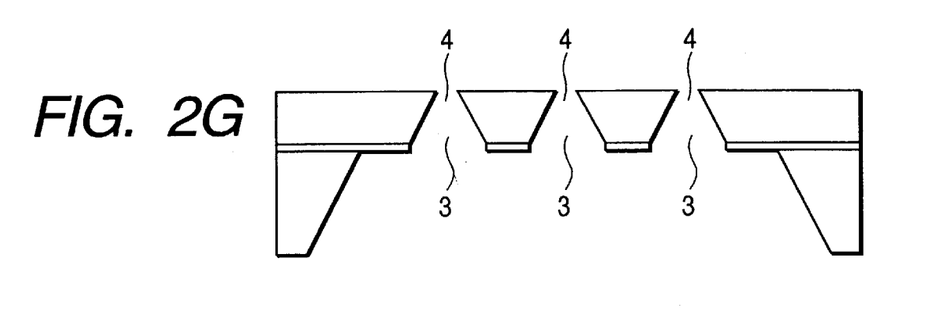

Then, micro-apertures 4 were produced on the surface of the substrate as the silicon dioxide 17 was removed by means of buffered hydrofluoric acid (FIG. 2G).

The surface of the substrate was etched uniformly by forming silicon dioxide on the substrate surface, using oxidizing gas, and sacrificially etching the silicon dioxide by means of hydrofluoric acid solution.

Figure 2H:
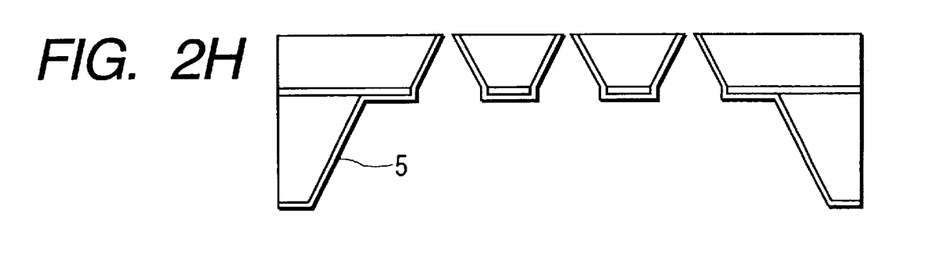

Finally, a 10 nm thick Pt film was formed as anti-light-transmission film 5 by sputtering to produce a plurality of optical probes having respective micro-apertures (FIG. 2H).

More specifically, a total of three optical probes having respective micro-apertures and arranged along a line were prepared in this example. When observed through a scanning electron microscope, it was found that all the micro-apertures of the optical probes had a diameter less than 20 nm.

Figure 3:
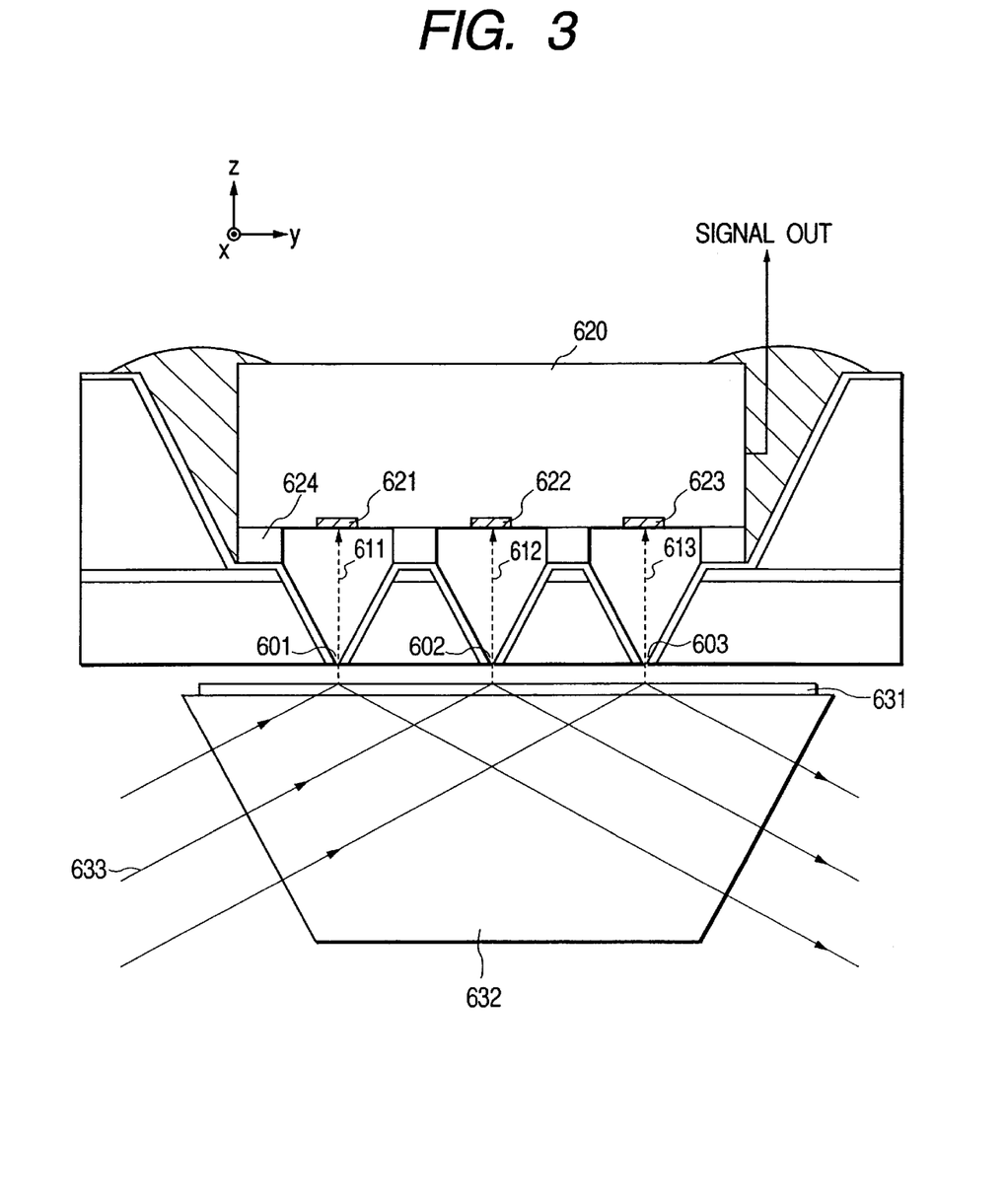
FIG. 3 is a schematic cross sectional view of a near-field optical microscope according to the invention and comprising optical probes provided with respective light detecting means.

Now, as an application, a near-field optical microscope, which was a multi-SNOM, was prepared by using a plurality of SNOM probes having respective micro-apertures in a manner as described below. FIG. 3 is a schematic cross sectional view of the near-field optical microscope according to the invention and comprising the optical probes, or SNOM probes, having respective light detecting means.

Referring to FIG. 3, reference numerals 601, 602 and 603 denote SNOM probes #1, #2 and #3 respectively. Beams #1 (611), #2 (612) and #3 (613) of evanescent light from the SNOM probes #1, #2 and #2 respectively strike photosensors 621, 622 and 623 of CCD 620, which is a light detecting means arranged in the recess, and detected independently for the intensity of light.

Partitions 624 were arranged between the CCD and the SNOM probes in order to prevent any stray light from appearing in the space separating the photosensors. Note that the photosensors of the CCD were arranged vis-a-vis the respective SNOM probes. The outer periphery of the CCD was bonded and secured to the surrounding portion of the optical probe unit by means of an epoxy resin type adhesive agent.

As a result of forming a plurality of micro-apertures on the flat surface of the substrate, the plurality of SNOM probes could be simultaneously brought close to the surface of the specimen with ease.

In the probe unit of this example, the micro-apertures are respectively coupled with corresponding apertures having a large diameter (up to several $\mu$m) to provide a space behind each micro-aperture so that a light detecting mechanism can be arranged in a close vicinity without using optical waveguides so that the unit can be hybridized with a light detecting mechanism without reducing the light detecting resolution. Additionally, since a CCD can be inserted into the recess, the height of the near-field optical microscope can be reduced relative to the combined thickness of the CCD and the optical probe unit. The specimen 631 to be observed is arranged on the transparent substrate 632 of the microscope. Light 633 is made to strike the specimen 631 from behind through the transparent substrate 632 with such an angle that all incident light is reflected by the surface of the specimen 631. Then, light would not transmit upward from the surface of the specimen 631 in FIG. 3 but evanescent light seeps out in the vicinity of the surface of the specimen within a zone separated from the surface by less than 0.1 $\mu$m at most.

As the tips of the SNOM probes #1 through #3 are made to contact the specimen, evanescent lights #1 (611), #2 (612) and #3 (613) pass through the respective micro-apertures of the SNOM probes to become detected by the photosensors #1, #2 and #3 (621, 622, 623) respectively arranged behind the micro-apertures. The current signals of the detected evanescent lights are then transformed into voltage signals by the I/V conversion circuit in the CCD and the signals from the photsensors are then output as SNOM signals.

An xy-actuator (not shown) was used to drive the SNOM probes #1 through #3 to scan the specimen 631 two-dimensionally along the surface of the specimen (in the x-y plane in FIG. 3) and the SNOM signals collected at different spots in the x-y plane were plotted to obtain an SNOM image for the surface of the specimen 631.

Example 2

In Example 2, a total of 100 micro-apertures arranged in a 10×10 matrix were prepared for optical probes as described above by referring to Example 1. The micro-apertures were observed through a scanning electron microscope to find that their diameters were between 10 and 30 nm. The surface of the substrate were etched uniformly by forming silicon dioxide on the substrate surface, using oxidizing gas, and sacrificially etching the silicon dioxide by means of hydrofluoric acid solution.

Example 3

In Example 3, an optical probe unit having light irradiating means was prepared in a manner as described below.

Figure 4:
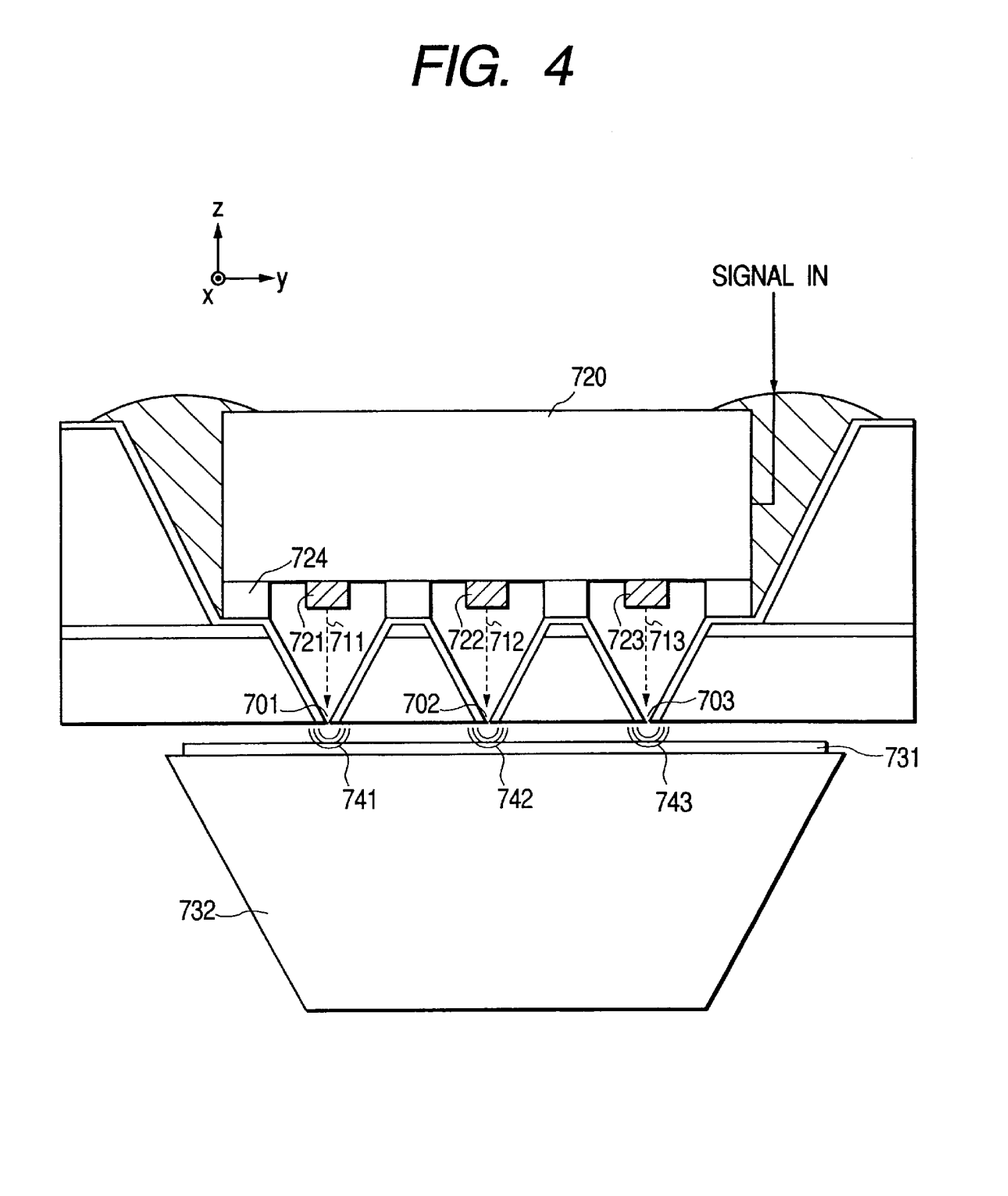
FIG. 4 is a schematic cross sectional view of part of an information recording apparatus according to the invention and comprising optical probes provided with respective light irradiating means.

FIG. 4 is a schematic cross sectional view of part of an information recording apparatus according to the invention and having a plurality of micro-apertures for so many optical probes provided with respective light irradiating means. The optical probe unit was used as optical recording head of an opto-magnetic recording system. Referring to FIG. 4, reference numerals 701, 702 and 703 denote probes #1, #2 and #3 respectively comprising micro-apertures the same as those prepared in Example 1 above. Laser beams 711, 712 and 713 emitted from respective surface light emitting lasers 721, 722, 723 of a surface light emitting laser array 720 arranged on a single substrate and fitted to the recess of the optical probe unit as light irradiating means seep out from respective probes #1, #2 and #3 as evanescent lights #1 (741), #2 (742) and #3 (743). Partitions 724 were arranged between the surface of the surface light emitting laser array and the recess of the optical probe unit in order to prevent any stray light of the surface light emitting lasers from appearing. Note that the surface light emitting lasers of the surface light emitting laser array were arranged vis-a-vis the respective probes. The outer periphery of the surface light emitting laser array was bonded and secured to the surrounding portion of the optical probe unit by means of an epoxy resin type adhesive agent.

In the probe unit of this example, the micro-apertures are respectively coupled with corresponding apertures having a large diameter (up to several $\mu$m) to provide a space behind each micro-aperture so that a light detecting mechanism typically comprising surface light emitting lasers can be arranged in a close vicinity without using optical waveguides so that the unit can be hybridized with a light detecting mechanism. Additionally, since a surface light emitting laser array can be inserted into the recess, the height of the optical recording head can be reduced significantly.

Recording medium 731 is arranged on the transparent substrate 732. The recording medium 731 is made of an opto-magnetic recording material adapted to change the direction of magnetization when heated with light and subjected to a magnetic field. The laser beams 711, 712 and 713 emitted respectively from the surface light emitting lasers #1, #2 and #3 (721, 722 and 723) arranged at the back of the probes #1, #2 and #3 seep out from the surface of the optical probe unit through the probes #1, #2 and #3 in the vicinity of the surface of the specimen within a zone separated from the surface of the substrate of the optical probe unit by less than 0.1 $\mu$m at most.

As the substrate surfaces of the probes #1 through #3 (701 through 703) are made to contact the recording medium, evanescent lights #1 (741), #2 (742) and #3 (743) heat the surface of the recording medium. As a magnetic field is generated by a coil (not shown) arranged under the transparent substrate 732, the direction of magnetization of the recording medium in areas heated by evanescent light is aligned with the magnetic field to produce recording pits. The direction of magnetization can be inverted by inverting that of the magnetic field generated by the coil. It was possible to prepare optical probes operating as multiple optical recording heads adapted to emit evanescent light when an external recording signal is input to the surface light emitting laser array to oscillate independently the surface light emitting lasers #1, #2 and #3 and cause them to emit laser beams independently.

With the above arrangement, since a plurality of micro-apertures can be formed on the flat surface of the substrate, a plurality of probes can be brought close to the surface of the recording medium simultaneously with ease.

An xy-actuator (not shown) was used to drive the probes #1 through #3 to scan the specimen 731 two-dimensionally along the surface of the specimen (in the x-y plane in FIG. 4) and produce recording pits on the surface of the specimen 731.

Light was made to strike the transparent substrate 732 from behind with such an angle that all incident light is reflected by the surface of the recording medium 731 to observe the evanescent light coming from the surface of the recording medium 731 by using a near-field optical microscope as shown in FIG. 3 and described above by referring to Example 1. As a result, it was confirmed that recording pits had been formed on the surface of the recording medium 731.

Example 4

This example represents a second mode of carrying out the method of manufacturing optical probes according to the invention. FIGS. 5A through 5G are schematic cross sectional views of optical probes being prepared by the second mode of carrying out the invention, showing different manufacturing steps.

The manufacturing process of this example will be described below.

Figure 5A:
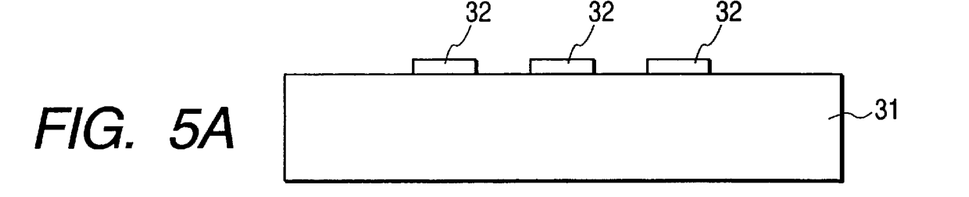
FIGS. 5A, 5B, 5C, 5D, 5E, 5F and 5G are schematic cross sectional views of optical probes being prepared by a second mode of carrying out the invention, showing different manufacturing steps.

A pattern of photoresist 32 as shown in FIG. 5A was formed on a 525 µm thick silicon substrate 31 having a planar orientation of plane <100> and a resistivity of 1 to 10 Ωcm by using a photolithography process. The pattern had a size of 20 µm square.

Figure 5B:
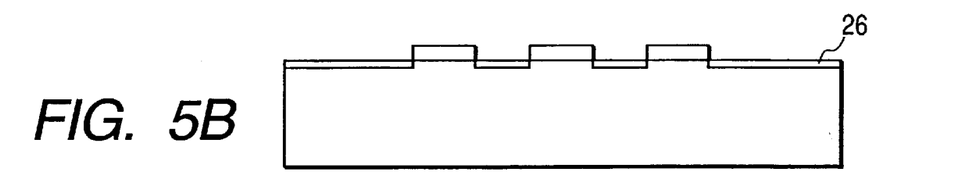

Then, phosphor (P) ions were implanted into the surface of the silicon substrate by means of an ion implanter, using the photoresist 32 as mask. After removing the photoresist, an n-type diffusion layer having an impurity concentration of $1\times10^{18}cm^{-3}$ was formed for the etching stop layer 26 by thermal diffusion (FIG. 5B).

Figure 5C:
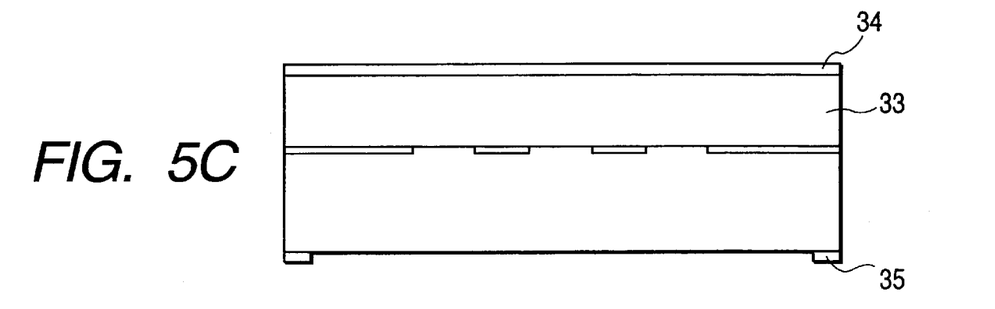

A pn-junction was formed on the interface of the n-type diffusion layer and the p-type silicon substrate. Thereafter, a 15 µm thick p-type epitaxial layer 33, through which through holes were to be opened in a subsequent step, was formed by means of an induction heating type epitaxial growth system, using monosilane gas and diborane gas. Then, a 1 µm thick silicon dioxide film 34 was formed on the epitaxial layer and the rear surface of the silicon substrate by using a mixture gas of oxygen and hydrogen. Then, the silicon dioxide film 34 on the rear surface was partly removed by means of photolithography and etching, using buffered hydrofluoric acid, to produce a mask 35, where the silicon substrate was partly exposed (FIG. 5C).

Subsequently, the substrate was subjected to a crystal orientation-dependent anisotropic etching operation using a TMAH aqueous solution with a concentration of 22% at solution temperature of 80° C., the etching operation being also referred to as pn-junction etching. Note that the n-type diffusion layer is not etched by applying a voltage.

Figure 5D:
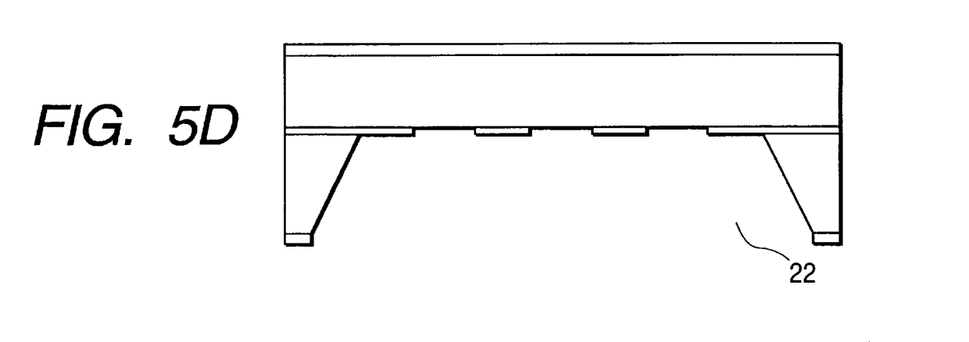

As a result, a recess 22 having a trapezoidal cross section and surrounded by crystal planes of (111) was formed (FIG. 5D).

Figure 5E:
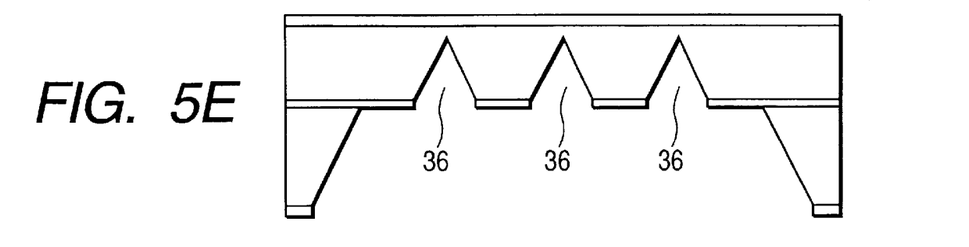

Then, the epitaxial layer was etched further through the spots free from impurities of the etching stop layer by continuing the anisotropic etching to produce pits 36 as shown in FIG. 5E. The epitaxial layer was found over the top of the pits. The pits had a pyramidal-shaped profile surrounded by crystal planes of (111). The time required to produce pits was as short as one fortieth of the time used for producing the recess so that the pits could be effectively prevented from any undesired expansion that could have occurred if the etching operation had been prolonged to consequently etch into the plane of (111).

Thereafter, the silicon dioxide on the opposite surfaces of the substrate as shown in FIG. 5E was removed by means of buffered hydrofluoric acid.

Figure 5F:
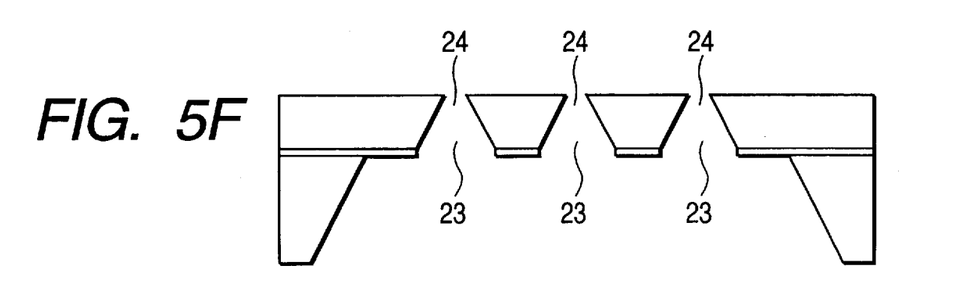
Figure 5G:
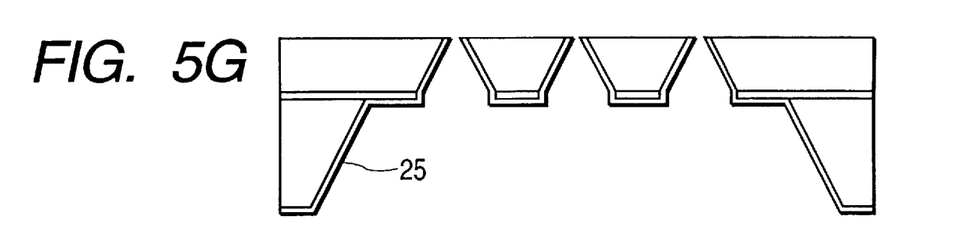

Then the surface of the substrate was etched by reactive ion etching using $CF_4$ to form through holes 23 as shown in FIG. 5F and to open micro-apertures 24 on the surface of the substrate. Finally, a 10 nm thick Al film was formed as anti-light-transmission film 25 by sputtering to produce a plurality of optical probes having respective micro-apertures (FIG. 5G).

More specifically, a total of three optical probes having respective micro-apertures and arranged along a line were prepared in this example. When observed through a scanning electron microscope, it was found that all the micro-apertures of the optical probes had a diameter less than 40 nm.

As described above, according to the invention, a recess is formed from the rear surface of substrate and through holes are opened through the substrate from the recess on the rear side to produce micro-apertures on the front surface of the substrate, the recess having a diameter significantly greater than that of the through holes. As a result of forming micro-apertures on the surface of the substrate and linking them respectively with the corresponding through holes, the pitch of arranging through holes in the recess can be raised to increase the density of arrangement of micro-apertures on the front surface of substrate.

Additionally, since micro-apertures can be formed on the flat surface of the substrate, a plurality of optical probes can be brought close to the surface of the specimen with ease.

Still additionally, light detecting means or light irradiating means can be connected not to the edge of the substrate but directly to the respective through holes from the back side to facilitate the optical connecting operation.

Finally, by arranging the light detecting means or the light irradiating means in the recess, the optical probes provided with them can be dimensionally further reduced in thickness.

With the method of manufacturing optical probes according to the invention, very fine optical probes having a uniform aperture profile can be formed by cutting through holes in a single-crystalline silicon substrate by means of crystal orientation-dependent anisotropic etching.

Additionally, with the method of manufacturing optical probes according to the invention, an etching stop layer may be arranged in the silicon substrate to control the depth of the recess to be formed so that the micro-apertures on the surface of the substrate can be accurately controlled.

Still additionally, with the method of manufacturing optical probes according to the invention, an array of micro-apertures can be formed in an accurately reproducible manner by forming pyramidal-shaped pits in the substrate from the rear surface by crystal orientation-dependent anisotropic etching and thereafter forming openings at the front ends of the pits for through holes by etching the substrate from the front surface.

According to the invention, an optical probe unit comprising optical detecting means adapted to detect light independently can be realized by using optical probes according to the invention. Thus, a near-field optical microscope can be realized by using such optical probes as SNOM probes.

Finally, according to the invention, an optical probe unit adapted to emit evanescent light independently can be realized by using optical probes according to the invention.

What is claimed is:

1. A method of manufacturing an optical probe for detecting or irradiating evanescent light, comprising steps of:
    forming a film having a regulated film thickness on a front surface of a substrate;
    forming a recess from a rear surface of the substrate;
    forming a pit having an apex in the film by etching the film through the recess; and
    forming a through hole in the film by etching the film from a side of the front surface of the substrate.

2. A method according to claim 1, further comprising a step of:
    forming an anti-light-transmission film on the inner walls of the through holes.

3. A method according to claim 1, further comprising a step of:
    forming an etching stop film in order to form the recess in the substrate before forming the film.

4. A method according to claim 3, wherein an opening is arranged in the etching stop film for forming the through hole in the film.

5. A method according to claim 1, wherein the substrate is made of single-crystalline silicon.

6. A method according to claim 1, wherein the etching is crystal orientation-dependent anisotropic etching.

7. A method according to claim 2, wherein the anti-light-transmission film is made of metal.

8. A method according to claim 6, wherein the through hole is a pyramidal-shaped hole.

9. A method according to claim 8, wherein the etching from the front surface side of the substrate is sacrificial etching.

10. A method according to claim 1, wherein a plurality of through holes are formed.

11. An optical probe unit prepared by the method according to claim 1.

12. An optical probe unit according to claim 11, wherein said optical probe unit comprises light detecting means fitted to the rear surface of said substrate.

13. An optical probe unit according to claim 11, wherein said optical probe unit comprises light irradiating means fitted to the rear surface of said substrate.

14. An optical probe unit according to claim 12, wherein a plurality of through holes are formed and a plurality of light detecting means are arranged independently corresponding to the respective through holes.

15. An optical probe unit according to claim 13, wherein a plurality of through holes are formed and a plurality of light irradiating means are arranged independently corresponding to the respective through holes.

16. An optical probe unit according to claim 11, wherein said through hole has a diameter not greater than 100 nm at the front surface of said substrate.

17. An optical probe unit according to claim 12, wherein said light detecting means is arranged in said recess.

18. An optical probe unit according to claim 13, wherein said light irradiating means is arranged in said recess.

19. A near-field optical microscope comprising:
    an optical probe unit according to claim 11, and
    means for irradiating light to a rear side of a specimen;
    wherein the surface structure of said specimen can be observed by irradiating light by said means and detecting evanescent light seeping out from the surface of said specimen by means of said optical probe unit.

* * * * *

UNITED STATES PATENT AND TRADEMARK OFFICE
CERTIFICATE OF CORRECTION

PATENT NO. : 6,215,114 B1
DATED : April 10, 2001
INVENTOR(S) : Takayuki Yagi et al.

It is certified that error appears in the above-identified patent and that said Letters Patent is hereby corrected as shown below:

<u>Title page,</u>
After "*Assistant Examiner* - Kevin Pyo" insert -- *Attorney, Agent or Firm* - Fitzpatrick, Cella, Harper & Scinto --.

Signed and Sealed this

Sixth Day of August, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,215,114 B1 Page 1 of 1
DATED : April 10, 2001
INVENTOR(S) : Takayuki Yagi et al.

It is certified that error appears in the above-identified patent and that said Letters Patent is hereby corrected as shown below:

<u>Title page,</u>
After "*Assistant Examiner* - Kevin Pyo" insert -- *Attorney, Agent or Firm* - Fitzpatrick, Cella, Harper & Scinto --.
Before "[*] Notice:" insert -- [73] Assignee: Canon Kabushiki Kaisha, Tokyo (JP) --.

This certificate supersedes Certificate of Correction issued August 6, 2002.

Signed and Sealed this

Thirtieth Day of December, 2003

JAMES E. ROGAN
*Director of the United States Patent and Trademark Office*